United States Patent [19]

Allen et al.

[11] Patent Number: 5,259,697
[45] Date of Patent: Nov. 9, 1993

[54] COMPOSITION AND PROCESS FOR FORMING LOW PERMEABILITY BARRIERS FOR WASTE DISPOSAL SITES

[75] Inventors: Robert B. Allen, Orchard Park, N.Y.; Charles E. Jablonski, Bethlehem, Pa.; John D. Lynn, Center Valley, Pa.; Thomas H. Weidner, Allentown, Pa.

[73] Assignee: Bethlehem Steel Corporation, Bethlehem, Pa.

[21] Appl. No.: 498,950

[22] Filed: Mar. 26, 1990

Related U.S. Application Data

[63] Continuation-in-part of Ser. No. 349,006, May 9, 1989, Pat. No. 4,911,757, which is a continuation-in-part of Ser. No. 227,438, Jul. 29, 1988, Pat. No. 4,840,671, which is a continuation of Ser. No. 63,605, Jun. 18, 1987, abandoned.

[51] Int. Cl.$^5$ .............................................. B09B 1/00
[52] U.S. Cl. .............................. 405/129; 106/697; 106/707
[58] Field of Search ............... 405/128, 129, 263, 267; 106/85, 120, DIG. 1, 900, 638, 697, 707

[56] References Cited

U.S. PATENT DOCUMENTS

| | | | |
|---|---|---|---|
| Re. 29,783 | 9/1978 | Smith et al. | 210/59 |
| 3,341,341 | 9/1967 | Corson et al. | 106/679 |
| 3,579,443 | 5/1971 | Horst | 210/715 |
| 3,586,624 | 6/1971 | Larson | 405/129 |
| 3,634,115 | 1/1972 | Minnick | 106/705 |
| 3,720,609 | 3/1973 | Smith et al. | 210/751 |
| 3,852,084 | 12/1974 | Webster et al. | 106/710 |
| 3,960,723 | 6/1976 | Butler | 210/720 X |
| 4,028,130 | 6/1977 | Webster et al. | 405/129 X |
| 4,116,705 | 9/1978 | Chappell | 106/697 |
| 4,226,630 | 10/1980 | Styron | 106/DIG. 1 X |
| 4,434,060 | 2/1984 | Altmansberger et al. | 210/724 |
| 4,465,597 | 8/1984 | Herman et al. | 210/713 |
| 4,496,267 | 1/1985 | Gnaedinger | 405/128 X |
| 4,518,508 | 5/1985 | Conner | 210/751 |
| 4,566,912 | 1/1986 | Borg | 134/13 |
| 4,566,975 | 1/1986 | Allgulin | 210/711 |
| 4,668,124 | 5/1987 | Pitts et al. | 405/129 |
| 4,726,713 | 2/1988 | Tallard | 405/267 |
| 4,741,776 | 5/1988 | Bye et al. | 106/89 |
| 4,768,897 | 9/1988 | Nussbaumer et al. | 405/128 |
| 4,911,757 | 3/1990 | Lynn et al. | 106/85 |
| 5,028,272 | 7/1991 | Bonee | 405/129 X |
| 5,040,920 | 8/1991 | Forrester | 405/129 |
| 5,054,406 | 10/1991 | Judd | 405/129 X |

FOREIGN PATENT DOCUMENTS

| | | | |
|---|---|---|---|
| 3041706 | 5/1982 | Fed. Rep. of Germany | 405/128 |
| 201578 | 12/1982 | Japan | 405/129 |
| 692793 | 10/1979 | U.S.S.R. | 106/85 |

Primary Examiner—Randolph A. Reese
Assistant Examiner—John A. Ricci
Attorney, Agent, or Firm—Eckert Seamans Cherin & Mellott

[57] ABSTRACT

A low-permeability barrier for waste disposal sites such as landfills and waste lagoons, and a method for constructing the same, includes a waste material. The waste material is stabilized to decrease the permeability characteristics of the waste material and may be further processed to improve the structural characteristics of the waste material and to prevent leaching of any leachable components. A method is provided for applying the waste material to the waste disposal site as a liner, interim cover, and/or final cover.

21 Claims, 4 Drawing Sheets

SEM MICROGRAPH OF A SECTION OF
OF AIR DRIED SAMPLE A ( Mag. X1000 )

SEM MICROGRAPH OF A SECTION OF
AIR DRIED SAMPLE A ( Mag. X10 )

CURING TIME vs. COMPRESSIVE STRENGTH

CURING TIME vs. PERMEABILITY

COMPOSITION AND PROCESS FOR FORMING LOW PERMEABILITY BARRIERS FOR WASTE DISPOSAL SITES

CROSS REFERENCE TO RELATED APPLICATIONS

This application is a continuation-in-part application of U.S. patent application Ser. No. 349,006 filed May 9, 1989, U.S. Pat. No. 4,911,757, which was a continuation-in-part of U.S. patent application Ser. No. 227,438, filed Jul. 29, 1988, now U.S. Pat. No. 4,840,671, which was a file wrapper continuation of U.S. patent application Ser. No. 063,605, filed Jun. 18, 1987, now abandoned.

BACKGROUND OF THE INVENTION

1. Field of the Invention

This invention relates generally to waste lagoon and landfill constructions, and more particularly to compositions and processes for constructing low-permeability barriers for waste lagoons and landfills.

2. Description of the Relevant Art

The proliferation and filling of waste disposal sites such as waste lagoons and landfills has raised increasing concern regarding the long term effects of degradation of the landfill on the surrounding environment. Of primary concern is the effect of water drainage through the landfill, which drainage will leach hazardous substances from the landfill material and will transport these substances to the surrounding environment. Strict government regulations have therefore been promulgated which require the construction of barriers around the landfill area, and as a final cover or cap over the waste lagoon or landfill site. These requirements primarily relate to the permeability of the barrier to water and other liquids, which permeability should be minimized. Water-resistant materials currently used as liners include polyethylene. A cap or the final cover must also be engineered to minimize infiltration of precipitation into the landfill, and therefore must be no more permeable than a liner system. Any potential disruption of continuity and functionality of the cover must be minimized. It is therefore preferable to provide a cover design which will have good drainage, minimum erosion, and require minimum maintenance.

Final covers for waste lagoons and landfills commonly have three layers: a vegetated top cover, a middle drainage layer and a low-permeability bottom layer. The low-permeability bottom layer is usually composed of two components, including an upper geomembrane and bedding material of well graded sand for drainage. A lower component can include a layer of compacted clay, sometimes two or three feet thick and having a hydraulic conductivity of no more than $1 \times 10^{-7}$ centimeters per second. The low permeability of the material will reject the transmission of fluid into the landfill, will minimize the generation of leachate, and will also minimize the filling of the landfill with leachate (the "bathtub" effect). Current low-permeability barriers are usually quite thick, often two to three feet, and can significantly decrease the available volume in the waste disposal site for the actual disposal of waste materials.

The geomembrane is expected to deteriorate in time, after which the compacted clay layer will be entirely responsible for the prevention of infiltration. Settlement and frost heaving are two occurrences that will disrupt the functionality of this layer. The system should therefore be designed to take into consideration the long term settlement, and differential settlement, of the material under the cap, and the layer should be placed below the average depth of frost penetration in the area.

The low permeability layer will sometimes be used as an interim cap without a vegetative layer and a drainage layer. In these instances, it is additionally necessary to design the cap to minimize crack development and erosion.

SUMMARY OF THE INVENTION

The present invention is directed to compositions and processes for providing low-permeability barriers as liners and caps for waste disposal sites such as waste lagoons and landfills. At least one stabilizing composition is combined with a waste material, as necessary, to render the waste material suitable for use as a liner or cover. At least one permeability-decreasing component can be included in the stabilizing composition to minimize the amount of liquid entering or leaving the waste lagoon or landfill. The stabilizing composition can also include at least one immobilizing component, whereby any leachable components in the waste material, which may be hazardous, can be rendered virtually immobile. A structural component can also be included to improve the mechanical properties of the barrier composition. Barrier compositions according to the invention allow for thinner barrier layers, provide a means for safely disposing of additional waste, provide a barrier that is compatible with the waste in the waste lagoon or landfill for recycling purposes, and provide a means in which interim caps can be built-up in successive layers.

Current stabilization/solidification technologies can be divided into techniques that are cement-based, silicate-based, thermoplastic, sorbent, organic polymer, encapsulation, or vitrification. The cement and silicate-based techniques are presently preferred for the invention. The permeability-decreasing component and the structural component are preferably present as a pozzolanic composition comprised of $SiO(2)$ and $Al(2)O(3)$, and $Fe(2)O(3)$ and calcium, usually as lime. The reaction products are calcium silicates and aluminates which act as natural cement similar to Portland cement. A low-permeability barrier is thereby formed from a waste material, which barrier will have mechanical properties resistant to cracking, erosion, frost heave, and settlement. Any leachable components in the waste material will become embedded in the cementitious matrix and the pozzolanic composition will therefore additionally function as an immobilizing agent for preventing the leaching of this component, which may be hazardous, from the waste material.

The leachable components should be capable of immobilization in the waste material. The manner in which the leachable components of the waste material are immobilized can be selected for the particular components that are present in the waste material. Heavy metals such as lead, cadmium and chromium, are common leachable components of waste materials, particularly in the steel industry. Ferrous ions have been found to assist in the immobilization of these heavy metals. A presently preferred source of ferrous ions for immobilizing such heavy metals is ferrous sulfate hepta-hydrate. It is also possible to immobilize the leachable components in a concretious matrix, and/or to add one or more agents to adsorb the leachable components.

Heavy metals, for example, have been found to become embedded in the calcium-alumino-silicate matrix of pozzolanic compositions.

Pozzolanic compositions have been found to serve as a permeability-decreasing agent, a leachable component immobilizing agent, as well as an agent to improve the structural properties of the waste material. It is alternatively possible to add combinations of different permeability-decreasing, immobilizing and/or structural improvement agents to the waste material to effectuate the desired stabilization of the waste material.

Waste materials suitable for treatment according to the invention include, but are not limited to, emission control dust/sludge from the production of steel in electric arc furnaces, wastewater treatment sludges from chromium electroplating and other electroplating operations, wastewater treatment sludges from chemical conversion coating operations, wastewater treatment sludges from steel forming and steel finishing operations, other metal processing wastes, lead and zinc-rich waste streams separated from iron-making and steel-making dusts and wastewater treatment sludges during iron-recovery operations, other metal recovery wastes, heavy metal-bearing dust/sludge from remediation of CERCLA (Superfund) sites and facilities undergoing RCRA corrective action, municipal incinerator fly ash, industrial waste incinerator fly ash, and other heavy metal-bearing wastes.

The water content of the composition is adjusted to provide a flowable material which can be pumped into the waste lagoon or landfill. Where the composition is used as a final cover or cap for a waste lagoon or landfill, it is usually required that the low-permeability barrier layer form the base layer of a tri-layered barrier. The upper layer is vegetative in nature and the middle layer provides for drainage. Waste material barriers according to the invention can also be applied in several layers as interim covers, which layers will also dispose of additional waste material. The invention permits reduced amounts of cap material as compared to previous low-permeability capping materials, such as compacted clay.

The treated compositions of the invention can be formed at a plant, in situ or in barrels. Plant mixing is presently preferred. The mixed material can also be carried in mobile mixing units and pumped onto the disposal site.

BRIEF DESCRIPTION OF THE DRAWINGS

There are shown in the drawings embodiments which are presently preferred it being understood, however, that the invention is not limited to the precise arrangements and instrumentalities shown, wherein.

DETAILED DESCRIPTION OF THE PREFERRED EMBODIMENT

Figure 1:
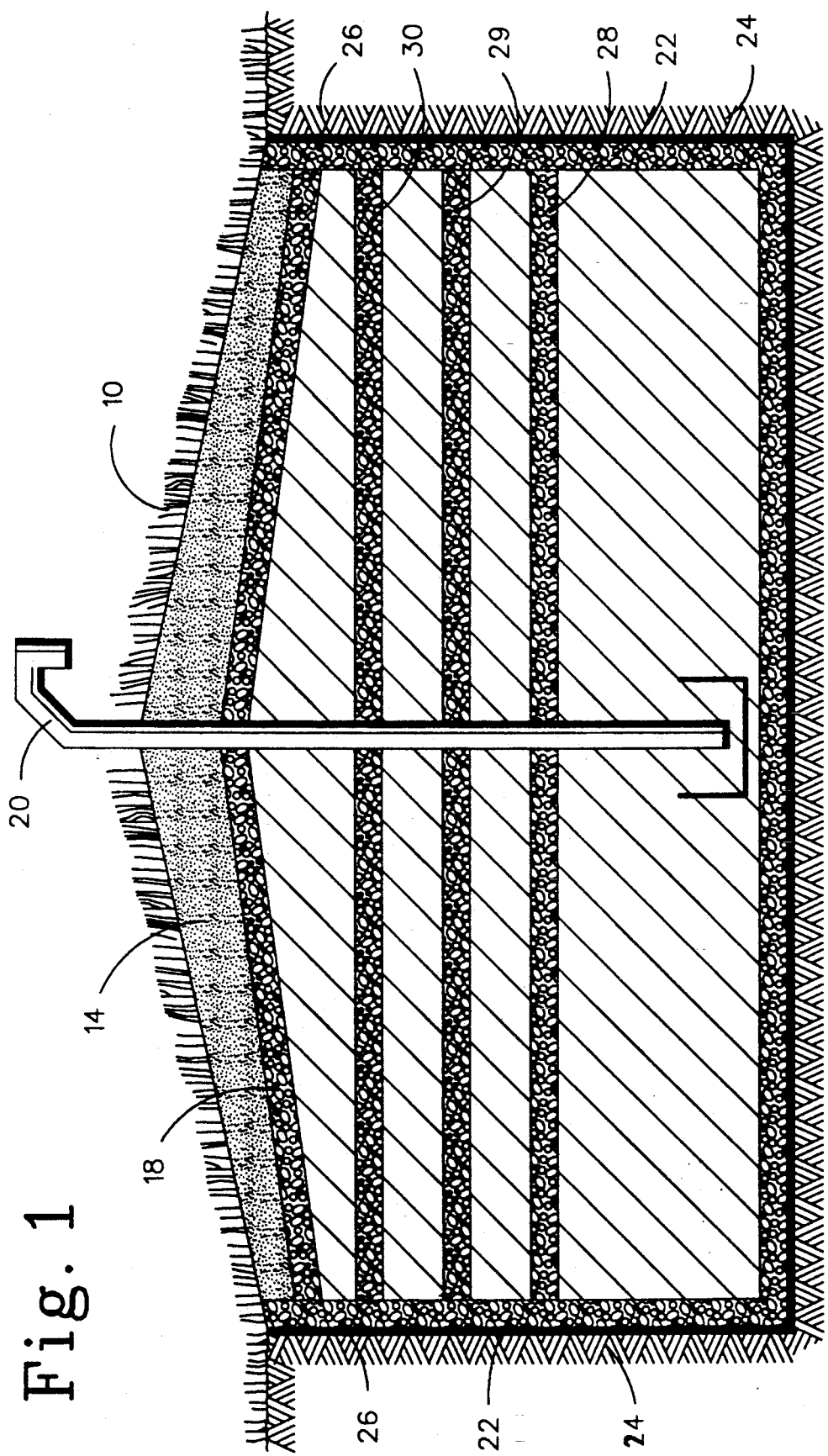
FIG. 1 is a schematic cross-sectional diagram of a landfill produced according to the invention.

The present invention provides a low-permeability barrier for waste disposal sites such as waste lagoons and landfills. The barrier comprises a stabilized waste material, which waste material will often include hazardous and non-hazardous leachable components such as heavy metals. The stabilization of such waste material typically involves the addition of at least one stabilizing component for the improvement of structural properties, the encapsulation or fixation of leachable components within the waste material, and a reduction in the permeability of the waste material to liquids such as water. The stabilizing components render the waste material suitable for use as a liner or cover for waste disposal sites. The necessary components and amounts to be added will often depend on the appropriate regulations for leaching, permeability, and structural properties governing the jurisdiction where the site is located. It is essential, where leachable components are present, that the stabilization process reduce leaching to acceptable standards. The stabilizing components can include at least one immobilizing component whereby leachable components such as heavy metals can be rendered virtually immobile. At least one permeability-decreasing component can be added to the waste composition to minimize the amount of liquid entering or leaving the waste lagoon or landfill. A structural component can be added to improve the structural properties of the barrier composition, and will provide resistance to cracking, erosion, frost heave and settlement.

Current stabilization/solidification technologies can generally be described as cement-based, silicate-based, thermoplastic, sorbent, organic polymer, encapsulation or vitrification. Lists of vendors of solidification/stabilization techniques are maintained by the USEPA Office of Solid Waste in Washington, D.C., the USEPA Solid and Hazardous Waste Research Division in Cincinnati, Ohio, and and U.S. Army Corps of Engineers Waterway Experiment Station in Vicksburg, Miss. Additional stabilization technologies are described in U.S. Pat. Nos. 4,518,508, 4,116,705, 4,566,975, 3,579,443, 3,960,723, 4,226,630, 4,434,060, 4,566,912, 3,341,341, 4,465,597, 3,634,115, 3,720,609, 3,852,084, 4,116,705, RE 29,783, 4,668,124 and 4,741,776. The disclosures of these patents are hereby fully incorporated by reference.

Although several stabilization/solidification technologies could be suitable for use with the invention, it is presently preferred to utilize cement and silicate based techniques in which pozzolanic or cementation reactions produce compounds which have good mechanical properties, durability, and an acceptably low liquid permeability. These processes will stabilize toxic inorganic industrial waste, and have also been shown to stabilize oily wastes effectively.

The solidification processes using silicate based materials generally involve pozzolanic reactions between $SiO_{(2)}$, $Al_{(2)}O_{(3)}$, $Fe_{(2)}O_{(3)}$ and available calcium and lime. These reactions produce very stable calcium silicates and aluminates which act as natural cement similar to Portland cement. A low-permeability barrier is thereby formed from a waste material, which also will have structural properties resistant to cracking, erosion, frost heave, and settlement. Leachable components may become embedded in the cementitious matrix and the pozzolanic composition will then additionally function as an immobilizing agent for preventing the leaching of leachable components from the waste material.

The improvement of structural properties of the waste material should preferably include an improvement in the mechanical strength of the material, as well as imparting resistance to settlement, frost heaving, crack development and erosion. Compressibility, creep and durability are relevant factors to judge the performance of a material, although the precise weight given to any one factor will be dependent upon the particular setting and characteristics of the installation. An unconfined compressive strength of 50 psi or greater is a preferred parameter. Resistance to water and liquid penetration is important to prevent the leaching of hazardous constituents from the waste lagoon or landfill. A coefficient of permeability (k) of $1 \times 10(-7)$ cm/sec. or lower is also preferred. A maximum desirable permeability would be about $k = 1 \times 10(-5)$ cm/sec.

The manner in which the leachable components are immobilized can be selected for the particular leachable components that are present in the waste material. Ferrous ions, for example, have been found to assist in the immobilization of heavy metals such as lead, cadmium and chromium. Ferrous ions can effectively reduce the leachate concentration of a stabilized waste material, as measured by such standards as the Extractive Procedure Toxicity Test (EPTT) leachate concentration test of the US Environmental Protection Agency (EPA). A presently preferred source of ferrous ions for such heavy metals is ferrous sulfate hepta-hydrate. Organic contaminants can be immobilized by agents and processes suitable for the particular organic contaminant. Encapsulation processes are useful for some organic contaminants. It is also possible to immobilize the leachable components in a concretious matrix, and/or to add one or more agents to adsorb the leachable components. Combinations of immobilizing agents are also possible.

Heavy metals have been found to become embedded in the calcium-alumino-silicate matrix of pozzolanic compositions. The pozzolanic composition serves as a permeability-decreasing agent, a leachable component immobilizing agent, and as an agent to improve the structural properties of the waste material. It is also possible to separately add permeability-decreasing, immobilizing, and/or structural improvement agents to the waste material, in alternative combinations, depending upon the particular waste material or leachable component at hand. It may not always be necessary to add at least one each of permeability-decreasing, immobilizing, and structural improvement components to the waste materials. The particular waste material or leachable component may be such that one or more of these components is not necessary and, with some waste compositions, little treatment of any kind may be necessary.

Waste materials suitable for use as low-permeability barriers according to with the invention include, but are not limited to, emission control dust/sludge from the production of steel in electric arc furnaces, wastewater treatment sludges from chromium electroplating and other electroplating operations, wastewater treatment sludges from chemical conversion coating operations, wastewater treatment sludges from steel forming and steel finishing operations, other metal processing wastes, lead and zinc-rich waste streams separated from iron-making and steel-making dusts and wastewater treatment sludges produced during iron recovery operations, other metal recovery wastes, heavy metal-bearing dust/sludge from remediation of CERCLA (Superfund) sites and facilities undergoing RCRA corrective action, municipal incinerator fly ash, industrial waste incinerator fly ash, and other heavy metal-bearing wastes.

It is presently believed that the invention is capable of use with waste materials, such as those described above, having a wide variation in composition. Waste materials having excessive oil and grease compositions, however, may not stabilize properly, particularly where cementitious compounds are used to stabilize the waste material. These hydrocarbons can interfere with the curing of the cementitious compounds. It is therefore presently believed that, especially where cementitious compounds are used to stabilize the waste material, the content of oils and greases in the waste material should preferably not exceed about 10%, by weight, and most preferably should not exceed about 5%, by weight.

In silicate-based processes, it has been observed that there may remain some amount of chemically unbound water in the mixture after solidification. This water may come to an equilibrium with the surroundings by leaching or evaporating in open air. The water loss, if excessive, may lead to volume change upon drying and thus deterioration of improved physical properties. Mechanical improvement methods such as compaction and/or preloading may alleviate such conditions by reducing the pore space and thus the ability of the material to take in or let out excessive amounts of water. Materials which form a continuous, crystalline matrix may crush under the high compactive or compressive force. Compression or compaction should therefore be done when the material is in a semi-solid state. The addition of permeability-decreasing components such as absorbent clays or other cementitious products may also result in a reduction of excess liquid in the mixture. The permeability-decreasing components will take up excess pore space, thus increasing the density and reducing the permeability of the material.

Silicate based processes can be implemented in-drum, in-situ, or by plant mixing. Plant mixing generally produces the highest mixing efficiency at a cost comparable to the in-situ method and at a cost significantly lower than the in-drum method. Certain processes can be carried out in mobile mixing units and pumped to the disposal site for additional cost benefits. The material can be applied at the site by known concrete pumping techniques, such as a mobile boom applicator assembly.

The thickness of the low-permeability barrier according to the invention will depend on the required permeability, strength, durability and erosion characteristics necessary for the particular site, together with the particular characteristics of the waste material. The invention may permit low-permeability barriers to be made of a reduced thickness. In any event, thick barriers according to the invention will dispose of additional waste material, and will not result in as significant a loss in waste lagoon or landfill disposal volume as with traditional barrier constructions. The barrier will normally, though not necessarily, be constructed from the same waste material that is disposed of in the waste disposal site for which it forms a barrier, and will therefore be compatible with this waste material for recycling purposes.

The general requirements for a landfill final cover design can be summarized as: a cap or the final cover must be engineered to minimize infiltration of precipitation into the landfill and must, therefore, be no more permeable than a liner system. Operation with minimum maintenance, and good drainage with minimum erosion, should be provided. The design should minimize the potential for disruption of continuity in the functionality of the cover. The final cover is usually required to have three layers, as shown in FIG. 1: a vegetated top cover layer 10, a middle drainage layer 14 and a low-permeability bottom layer 18. A gas vent 20 can be provided to release gas generated in the waste disposal site.

The invention provides a low-permeability barrier layer 18 which will reject the transmission of fluid into the landfill. By minimizing infiltration, the generation of leachate will be minimized and also filling of the landfill with leachate (the "bathtub" effect) will be prevented. Also, since the sludge contains organic materials, it is well suited for use in the land environment. It is expected that the upper component or the geomembrane will deteriorate in time. Then the barrier layer 18 will be expected to fulfill prevention of infiltration. Settlement and frost heaving are the two occurrences that can disrupt the functionality of this layer. Therefore, design of such systems should take into consideration the long term settlement and differential settlement of the material underneath the cap. To prevent frost heaving, the entire layer can be placed below the average depth of frost penetration in the area. A low-permeability liner 22 according to the invention can be utilized to prevent the passage of liquids and hazardous materials out of the landfill and into the surrounding soil 24. The low-permeability liner 22 comprises stabilized waste materials, usually the same waste materials that are present in the waste lagoon or landfill, and are therefore compatible for recycling purposes. The low-permeability liner 22 replaces or is in addition to polyethylene sheets 26 or other materials currently used to line waste lagoons and landfills.

Low-permeability barriers according to the invention can be used as interim covers, without the benefit of the protection of the vegetative layer and the drainage layer, during filling stages of the waste disposal site. It is possible to provide several interim covers 28-30 as necessary during the filling stages of the waste disposal site. The volume occupied by the interim covers 28-30 will not be lost, as the invention provides that waste material will be disposed as a component of the interim covers. If the layer is exposed, erosion and crack development due to desiccation can be added to the above-referred causes of disruption. The following factors should therefore be taken into consideration. The interim cover must provide allowances for or be designed to resist (1) settlement, (2) frost heaving, (3) crack development, and (4) erosion.

EXAMPLE-ELECTRIC ARC FURNACE DUST STABILIZATION

A preferred stabilization process that is suitable for waste materials including heavy metal bearing dusts and sludges is described in the Applicant's copending U.S. patent application Ser. No. 349,006, filed May 9, 1989, now U.S. Pat. No. 4,911,747, which was a file wrapper continuation of application Ser. No. 227,438, filed Jul. 29, 1988, now U.S. Pat. No. 4,840,671, which was a file wrapper continuation of U.S. patent application Ser. No. 063,605 filed Jun. 18, 1987. The disclosures of each of these patent applications and resulting patents are hereby incorporated fully by reference. These disclosures teach the preparation of a stabilized composition from a waste material such as would be found in the dust generated by an electric arc furnace (EAF) process and/or waste water treatment sludge and the like. The chemicals utilized include:

Fly ash and/or sludge, the major constituents being $SiO_2$ and $Al_2O_3$,
  lime dust, the major constituent being CaO
  Hydrated lime, the major constituent being $Ca(OH)_2$
  Ferrous sulfate hepta-hydrate While the proportions of such chemicals may vary over a limited range, a relationship for practicing this process is one where, by approximate weight %, the ingredients include EAF dust (35), fly ash (6), lime kiln dust (15), ferrous sulfate hepta-hydrate (10), hydrated lime (6) and water (28).

Using such proportions, the process involves the following steps:

1. Mixing the EAF dust and/or sludge, lime kiln dust, fly ash and hydrated lime for approximately 1 to 2 minutes. If necessary, the hydrated lime may be varied to insure a blend having an available alkalinity of between about 9 and about 9.5%.

2. Adding to said mixture an aqueous solution having a pH of about 7 and made from water, ferrous sulfate hepta-hydrate and calcium hydroxide.

3. Blending for approximately 10 minutes to yield a viscous paste-like material which, when cured with time, i.e., hours, produces an impermeable concrete-like solid waste. The hardening process may continue for a period of several weeks, or longer.

In a preferred embodiment of the invention, there is provided a calcium-alumino-silicate composition comprising the reaction product of an aqueous chemical waste sludge or EAF dust including a source of ferrous ions and selective additive materials. The presence of ferrous ions is desirable to improve the stabilization of heavy metals in the waste material. Ferrous sulfate hepta-hydrate is a currently preferred source of ferrous ions, and other sources could be utilized. The source of ferrous ions need not be clinically clean, but can also be derived from industrial waste sources such as the waste pickle liquor from steel-making processes.

The additive materials are selected such that the total composition of the additive ingredients and the sludge includes fly ash, electric arc furnace dust, lime kiln dust, ferrous sulfate, hydrated lime to provide an alkalinity of about 9 to 9.5%, and water. Tests have shown, however, that effective results can be achieved with an available alkalinity of between 6.9 and 11.5% CaO. The resulting composition contains at least 0.2% by weight of ferrous ions and is hardenable through chemical reactions so that the product includes calcium-alumino-silicates. A pH of between about 6.2 and 11.4 is suitable, and a pH of about 7 is preferred.

Preferably, the composition is the reaction product of about 25 to 70% by weight of sludge or electric arc furnace dust, about 3 to 10% by weight fly ash, about 10 to 20% by weight of lime kiln dust, about 5 to 15% by weight of a ferrous compound, about 5 to 15% by weight of lime, and the remainder being water. Water is added to insure flowability of the mixture, and the proper amount of water to be added can be determined empirically for the particular flow characteristics that are desired. The weight percent of ferrous ion in the composition is usually about 0.2 to 10% by weight. However, the amount may be higher without suffering any adverse effects. The calcium content of the composition is generally about 5 to 10% by weight. The composition also has a content of silicone oxide of about 2 to 10% by weight and a content of aluminum oxide of about 1 to 5% by weight.

EXAMPLE-LOW PERMEABILITY BARRIERS

Four solidified/stabilized waste materials were prepared with the following compositions:

TABLE I

Components of Stabilized Waste Samples by Weight

| Stabilized Waste Sample | A | B | C | D |
|---|---|---|---|---|
| Sludge* | 52.5 | 51.2 | 24.3 | 50.0 |
| Lime Dust and Ferrous Sulfate Hepta-hydrate (as spent pickle liquor) | 10.5 | 28.4 | 15.9 | 29.0 |
| Fine Slag | — | — | 50.0 | — |
| Fly Ash | 10.5 | 10.2 | 4.9 | 10.0 |
| Hydrated Lime | 10.5 | 10.2 | 4.9 | 10.0 |
| Water | 16.0 | — | — | — |
| Bentonite | — | — | — | 1.0 |

*Steel plant waste containing various iron compounds, oils, greases, etc.

The samples were prepared in 3" diameter and 6" length molds and allowed to cure in a humidity controlled chamber (95%) at about room temperature. Curing time was varied as 1, 7, 28 and 90 days for most samples. At the completion of each curing period, samples were tested for permeability, unconfined compressive strength and triaxial compressive strength. Each test was repeated on at least three samples and the results were averaged. The triaxial compression tests were conducted to assess the variation in cohesion and friction angle of the material as the curing progressed. The permeability tests were conducted in triaxial permeability cells manufactured to carry long-term hazardous waste research. The results of these tests are tabulated in Table II.

TABLE II

Results of Strength and Permeability Tests on Four Stabilized Waste Samples

| Stabilized Waste | Curing Period (days) | $q_u$* (psi) | $k$* (cm/s) | $c$* (psi) | $\Phi$* (deg) |
|---|---|---|---|---|---|
| A | 1 | 80.8 | $2.7 \times 10^{-7}$ | 34.5 | 9.5 |
|   | 7 | 97.6 | $2.9 \times 10^{-7}$ | 19.2 | 30.8 |
|   | 28 | 131.8 | $2.6 \times 10^{-7}$ | 30.1 | 30.0 |
|   | 90 | 110.1 | $1.3 \times 10^{-6}$ | 23.1 | 30.0 |
| B | 1 | 81.1 | $7.5 \times 10^{-7}$ | — | — |
|   | 28 | 95.3 | $1.3 \times 10^{-5}$ | 28.3 | 23.2 |
| C | 1 | 147.1 | $7.8 \times 10^{-7}$ | 6.7 | 41.8 |
|   | 7 | 204.3 | $4.2 \times 10^{-7}$ | 18.5 | 30.0 |
|   | 28 | 207.8 | $1.2 \times 10^{-6}$ | 35.6 | 34.5 |
| D | 1 | 59.7 | $8.0 \times 10^{-7}$ | 11.6 | 18.9 |
|   | 7 | 131.3 | $9.9 \times 10^{-7}$ | 19.5 | 34.7 |
|   | 28 | 131.8 | $1.8 \times 10^{-6}$ | — | — |

Figure 2:
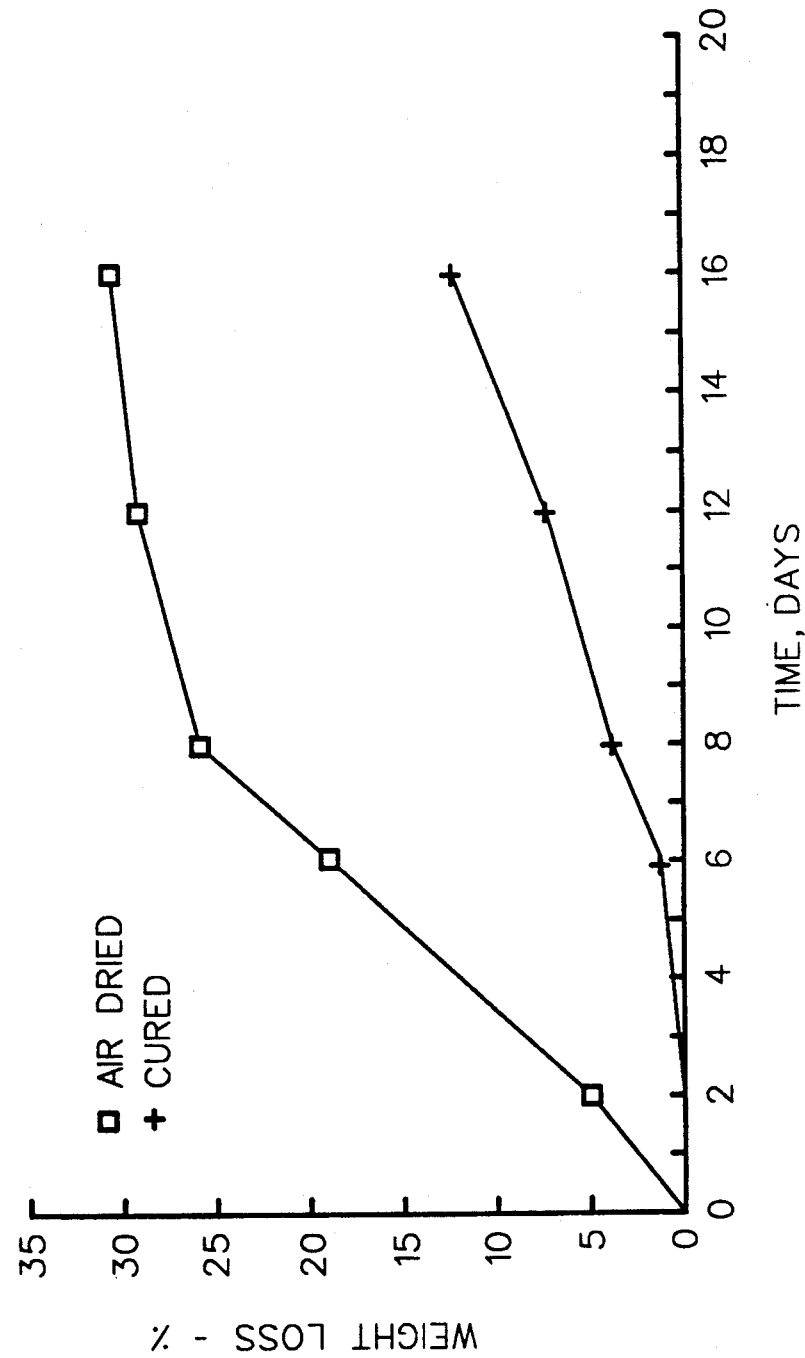
FIG. 2 is a graph illustrating properties of a low-permeability barrier according to the invention.
Figure 3A:
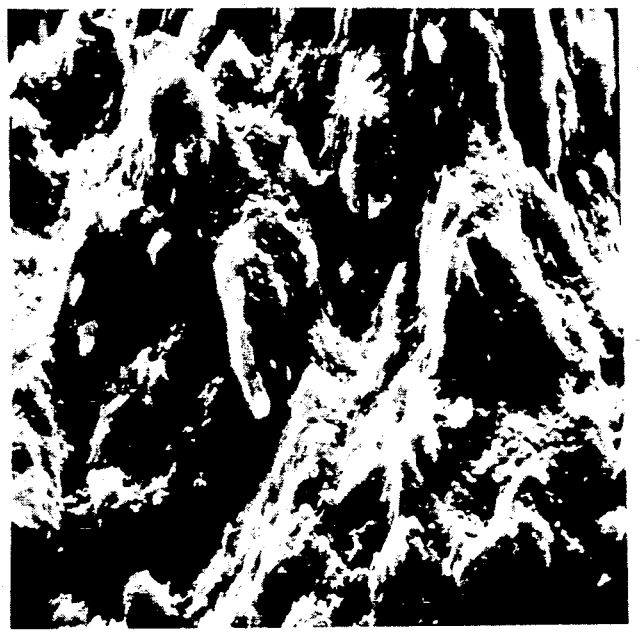
FIG. 3a-b are photographic illustrations of low-permeability barriers according to the invention.
Figure 3B:

*$q_u$ Unconfined compressive strength
$k$ Coefficient of permeability
$c$ Cohesion
$\Phi$ Internal friction angle Some of the samples were subjected to water loss measurements during air drying and during the curing stage. FIG. 2 shows the rate of water loss for sample A in air drying and curing. The initial wet unit weight was measured 100 pcf, and the dry unit weight around 75 pcf. Air dried Sample A was also observed under the scanning electron microscope (SEM) to help to understand the physical changes during solidification, and to assess any apparent influence of microstructure on the macro properties of the material. FIGS. 3a and 3b show typical SEM micrographs generated for this purpose.

Among the four samples given in Table I, sample A constituted the basic mixture. Variations in the basic formula were aimed to create mixtures with improved permeability and/or strength values. The unconfined compressive strength increased with curing time for all samples tested. This increase was faster and higher in sample C. Addition of fine slag in this case resulted in high strengths and good binding with angular slag particles scattered within the solidified matrix. The permeability increased slightly, which was anticipated with the addition of larger size particles. Nevertheless, the increase can be considered insignificant since the amount of slag added was on the order of 50% by weight of the total mixture, and could have produced higher permeability values. This indicates that there is good binding between the slag particles and the matrix material, similar to aggregate and cement in concrete. Addition of bentonite did not result in lowered values of permeability as was expected in sample D. Both in samples B and D the amount of one of the waste constituents, namely the proprietary ingredient, was increased. This resulted in similar strength values, but with increased permeability, which indicates poorer matrix development and possible formations of conduits of flow such as a network of hairline cracks.

It has been found that the formation of cracks can be reduced or avoided if moisture is maintained in the material for as long as is required for curing of the materials. This could be accomplished at the waste disposal site by putting a covering over the material adapted to maintain adequate moisture levels for the particular waste composition to avoid cracking throughout the period of time required for curing of the material.

Sample A appeared to attain reasonably high strength in time and maintain a level of low permeability. The ten-fold increase in the permeability and slight decrease in the unconfined strength of the 90 day specimen of sample A was attributed to improper operation of the humidity room which resulted in frequent fluctuation of surrounding temperature in short durations during that time. Fluctuation of temperature in extremes over 24 hours might have resulted in internal stresses and thus opening of minute cracks which increased the permeability and reduced the strength.

The cohesion and internal friction angle measurements appear to be consistent with the trend of permeability and compressive strength measurements. Unlike the unconfined compressive strength measurements, cohesion and internal friction angle values can be used to estimate variation of shear strength with depth of material. Cohesion gives a good indication of the binding of the material. Observing the results for sample A, it can be concluded that the initial strength of the material is more a function of cohesion than friction angle. As curing progresses, frictional strength of the material develops and attains a more or less constant value, whereas cohesion fluctuates. This may be due to the type of ongoing reactions, temperature variations and water loss trend of the material. However, the 28 day value of cohesion indicates high cohesive strength and good binding with the matrix. The initial low cohesion and the high friction angle of sample C is consistent with the expected reaction. The slag material adds significantly to the frictional resistance initially. As solidification progresses and cohesion increases, the frictional contribution of the slag diminishes slightly. This is due to the fact that the solidified material now encapsulates the slag particles, and the overall frictional resistance of the composite material has contributions both from the slag and the solidified matrix. The internal friction angle in most of the samples appear to attain a value on the order of 30 degrees, and a cohesion value of about 30 psi after 28 days of curing.

Figure 4:
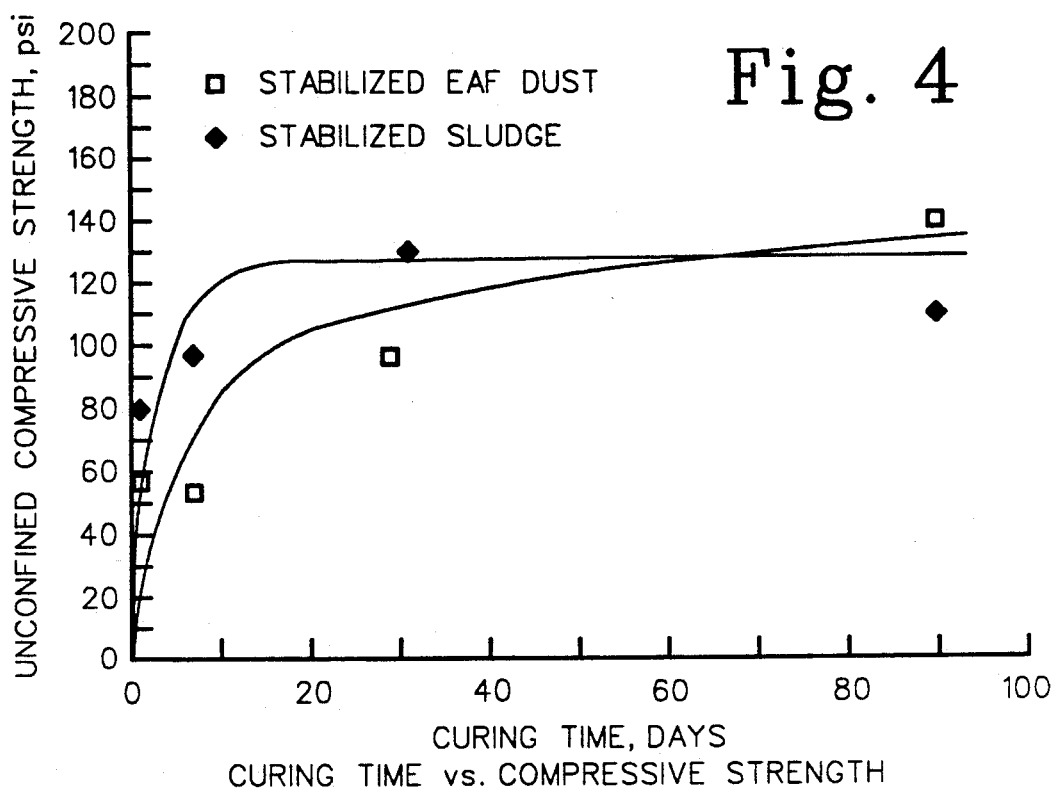
FIG. 4 is a graph illustrating the effect of curing time on unconfined compressive strength.
Figure 5:
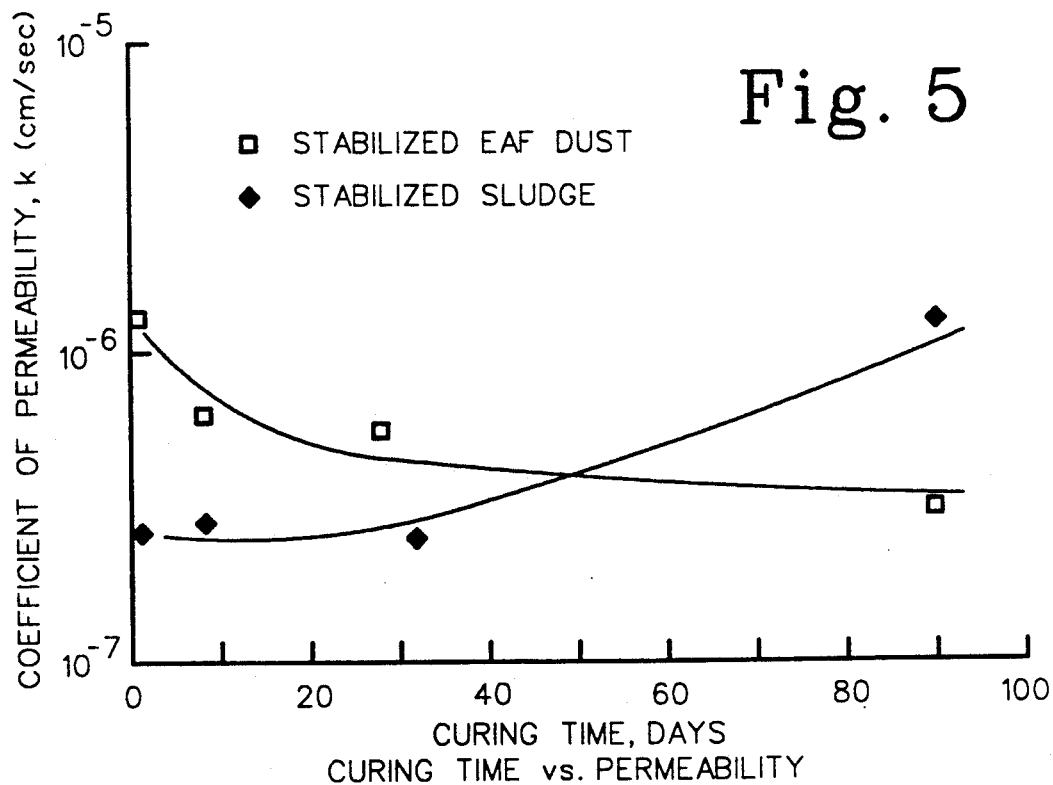
FIG. 5 is a graph illustrating the effect of curing time on the coefficient of permeability.

The 30% weight loss in 16 days of air drying, as shown in FIG. 2, indicates that there remains a significant portion of free water within the material after solidification. This has also been observed in other types of silicate-based stabilization processes. Mechanical compaction or vibration during placement may be a viable method to reduce the amount of free water density of the material. Use of adsorbent clay products may also prove to be effective in reducing free water content.

tests performed o a laboratory scale sample of the stabilized waste material are provided in Table V. The data demonstrates the degree to which the process immobilizes heavy metals. Typical chemical characteristics of the stabilized materials used in the process are presented in Table VI. The effect of curing time on unconfined compressive strength and on the coefficient of permeability is shown in FIGS. 4–5, respectively.

TABLE III

TOTAL CONSTITUENT ANALYSES OF DISPOSAL CELL DRILL CORE SAMPLES
CONSTITUTENT % (Water & Oil Free)

| Sample | $H_2O$ | O & G** | Fe | C*** | C | Zn | Pb | Ca | $SiO_2$ | $Al_2O_3$ | Ni | Cr | Cu | $Na_2O$ | $K_2O$ | MgO |
|---|---|---|---|---|---|---|---|---|---|---|---|---|---|---|---|---|
| 1A | 26.3 | NA | 50.6 | 2.3 | 3.7 | 1.0 | 0.13 | 7.1 | NA | NA | NA | NA | NA | NA | NA | NA |
| 1B | 26.1 | NA | 57.8 | 1.2 | 2.5 | 0.45 | 0.09 | 7.0 | NA | NA | NA | NA | NA | NA | NA | NA |
| 2A | 27.4 | 1.40 | 47.7 | 1.9 | 3.4 | 1.3 | 0.14 | 7.2 | 4.0 | 1.9 | <.05 | <.05 | <.05 | 0.08 | 0.08 | 3.3 |
| 2B | 32.8 | 0.43 | 49.1 | 1.6 | 3.1 | 0.79 | 0.13 | 7.4 | 4.1 | 0.85 | <.05 | <.05 | <.05 | 0.13 | 0.14 | 3.3 |
| 2C | 29.7 | 0.68 | 46.8 | 2.9 | 4.4 | 0.76 | 0.18 | 7.1 | 5.0 | 1.2 | <.05 | <.05 | <.05 | 0.14 | 0.15 | 3.3 |
| 3A | 29.7 | 1.00 | 50.1 | 1.2 | 2.7 | 1.2 | 0.15 | 6.9 | 3.3 | 1.3 | <.05 | <.05 | <.05 | 0.08 | 0.07 | 1.7 |
| 3B | 35.3 | 0.51 | 50.1 | 1.1 | 2.6 | 0.78 | 0.09 | 7.3 | 4.0 | 0.70 | <.05 | <.05 | <.05 | 0.09 | 0.10 | 3.3 |
| 3C | 33.5 | 0.17 | 48.4 | 2.2 | 3.7 | 0.83 | 0.13 | 7.2 | 4.7 | 1.2 | <.05 | <.05 | <.05 | 0.12 | 0.15 | 3.3 |
| 4A | 30.4 | NA | 47.9 | 2.7 | 4.3 | 1.3 | 0.10 | 7.3 | NA | NA | NA | NA | NA | NA | NA | NA |
| 4B | 32.1 | NA | 48.5 | 2.1 | 3.7 | 0.57 | 0.12 | 7.6 | NA | NA | NA | NA | NA | NA | NA | NA |
| Avg $\bar{X}$ | 30.0 | 0.7 | 49.2 | 1.9 | 3.1 | 0.9 | 0.13 | 7.2 | 4.2 | 1.2 | <.05 | <.05 | <.05 | 0.11 | 0.12 | 2.5 |
| $\sigma$ | 3.1 | 0.4 | 1.7 | 0.6 | 1.1 | 0.3 | 0.03 | 0.2 | 0.6 | 0.4 | — | — | — | 0.03 | 0.04 | 1.3 |

**O & G = oil and grease concentration on a dry basis
***elemental carbon
NA = not analyzed

TABLE IV

RESULTS OF EXTRACTION PROCEDURE (EP) TOXICITY TESTS*
WATER QUALITY CONTROL STATION (WQCS) SLUDGES

| Sample Identification | Sample Date(s) | EP Extract Metals Concentrations (ppm) | | | | | | | | |
|---|---|---|---|---|---|---|---|---|---|---|
| | | As | Ba | Cd | Cr | Pb | Hg | Ni | Se | Ag |
| WQCS (BOF)** Sludge | 07/02/80 | <0.01 | 2.1 | 0.01 | <0.02 | 0.11 | 0.002 | NA | <0.01 | <0.02 |
| WQCS High Density Sludge (HDS) | 07/03/80 | <0.01 | 2.1 | <0.01 | <0.02 | 0.24 | <0.002 | NA | <0.01 | <0.02 |
| WQCS HDS | 06/02/83 | 0.33 | 3.75 | 0.06 | 0.94 | 0.04 | 0.003 | NA | 0.31 | <0.01 |
| WQCS HDS | 07/01/83 | 0.04 | 1.09 | 0.02 | 0.16 | 0.06 | <0.002 | NA | 0.01 | <0.01 |
| WQCS HDS | 06/25-29/84 (composite) | <0.002 | <0.1 | 0.05 | <0.01 | 0.3 | <0.002 | NA | <0.002 | <0.01 |
| WQCS HDS Filter Cake | 08/31/88 | <0.5 | <10 | <0.1 | <0.5 | <0.5 | <0.02 | <0.5 | <0.1 | <0.5 |

*EP toxicity tests were conducted in accordance with procedures outlined in 40 CFR 261, Appendices II and III.
**BOF = basic oxygen furnace
na = not analyzed The microstructure illustrations of FIGS. 3a–b reveal information pertaining to some of the physical properties and behavior of the material. As observed in FIG. 3a, the solidified material displays a dense, crystalline matrix. At a lower magnification in FIG. 3b, however, the discontinuities and inclusions become evident. Such features might be responsible for an increase in permeability and also for a decrease in strength. Addition of cementing agents, fillers or adsorbent products which can form gel-like features and fill in the conduits, or render them discontinuous, are possible methods of improving the physical properties of the material.

EXAMPLE-LOW PERMEABILITY COVER

A low permeability cover to promote surface water runoff on a site was prepared with the composition of the invention. Drill hole samples from a landfill containing basic oxygen furnace thickener sludge were obtained and tested. The results are shown in Table III. The results of extractive procedure toxicity tests show that the waste material in the waste disposal site of the Example contain appreciable iron concentrations, is not a hazardous waste, and poses a negligible threat to human health and the environment in terms of leachable hazardous components. These data are summarized in Table IV. The results of EP toxicity tests and TCLP

TABLE V

EPTT AND TCLP DATA FOR
CHEMICALLY STABILIZED
WQCS FILTER CAKE

| | Leachate Analysis, ppm | |
|---|---|---|
| | EPPT | TCLP |
| Pb | <.01 | <.01 |
| Cd | <.02 | <.02 |
| Cr | <.05 | <.05 |
| As | <.02 | NA |
| Ba | 1.0 | NA |
| Hg | <0.002 | NA |
| Se | <.05 | NA |
| Ag | <.05 | NA |
| Ni | <.1 | NA |

NA = not available

TABLE VI

PERTINENT CHEMICAL CHARACTERISTICS
STABILIZATION MATERIALS FOR EXAMPLE PROCESS

| Constituent | Fly Ash (%) | Hydrated Lime (%) | Spent Pickle Liquor (ppm) | |
|---|---|---|---|---|
| | | | HCl | $H_2SO_4$ |
| CaO (total) | 0.7 | — | $Fe^{++}$ | 110,000 | 140,800 |
| $Ca(OH)_2$ | — | 93.5 | Acidity$^{Free}$ | 60,000 | 73,200 |
| $CaCO_3$ | — | 1.5 | Acidity$^{TOT}$ | 130,000 | 150,000 |
| MgO | 0.9 | 1.3 | Cl | 160,000 | — |

TABLE VI-continued

PERTINENT CHEMICAL CHARACTERISTICS
STABILIZATION MATERIALS FOR EXAMPLE PROCESS

| Constituent | Fly Ash (%) | Hydrated Lime (%) | Spent Pickle Liquor (ppm) | |
|---|---|---|---|---|
| | | | HCl | $H_2SO_4$ |
| $SiO_2$ | 59.2 | 1.2 | $SO_4$ — | 13,500 |
| $Al_2O_3$ | 22.9 | 0.5 | | |
| $Fe_2O_3$ | 6.3 | 0.3 | | |

The present invention is capable of use with a variety of stabilization compositions and processes, waste materials, and leachable components, without departing from the essential attributes of the present invention. Reference should therefore be had to the following claims, rather than to the foregoing specification, as indicating the scope of the invention.

We claim:

1. A low-permeability barrier for waste lagoons and landfills, comprising a stabilized waste material having at least one stabilizing component selected from the group consisting of components adapted to immobilize leachable components in said waste material, to decrease the liquid permeability of said waste material, and to improve the structural properties of said waste material wherein said waste material comprises at least one leachable component, and at least one immobilizing component which comprises ferrous ions for immobilizing said leachable component, said stabilizing component further comprising at least one structural component for increasing the compressive strength of said waste material.

2. The low-permeability barrier of claim 1, wherein said ferrous ions are added as ferrous hepta-hydrate.

3. A cap for a waste disposal site, said waste disposal site containing a waste material having at least one leachable component, said cap comprising:
   said waste material;
   a stabilizing component which comprises ferrous ions adapted to immobilize said leachable component in said waste material, and
   a component adapted to decrease the liquid permeability of said having material.

4. The cap of claim 3, wherein said ferrous ions are added as ferrous hepta-hydrate.

5. A method for constructing a low-permeability barrier for a waste disposal site which is to confine a quantity of waste material, comprising the steps of:
   testing a portion of said quantity of waste material for the presence of leachable contaminants, for liquid permeability, and for structural properties, to generate test results;
   comparing said test results with appropriate government standards;
   mixing with said portion of waste material, if necessary, to meet said government standards at least one of the group consisting of stabilizing components adapted to immobilize leachable components, to decrease the liquid permeability of the portion of said waste material, and to improve the structural characteristics of said portion of said waste material; and
   using said portion of said waste material, which meets government standards, to form a barrier for said waste disposal site to confine said quantity of waste material.

6. The method of claim 5, wherein said waste material comprises at least one leachable component, and further comprising the step of adding an immobilizing component to said portion of waste material during said mixing step, said immobilizing component being adapted to prevent the leaching of said leachable component.

7. The method of claim 6, wherein said leachable component is a heavy metal and said immobilizing component includes ferrous ions.

8. The method of claim 7, wherein said ferrous ions are added as ferrous hepta-hydrate.

9. The method of claim 5, wherein said stabilizing component is a cementitious composition.

10. The method of claim 9, wherein said cementitious composition is a calcium alumina-silicate.

11. The method of claim 5, wherein said waste material comprises at least one selected from the group consisting of emission control waste from the production of steel in electric arc furnaces; waste water treatment sludges from electroplating operations; waste water treatment sludges from chemical conversion coating operations; waste water treatment sludges from steel forming operations; waste water treatment sludges from steel finishing operations; metal processing wastes; lead rich waste streams separated from dusts from iron making and steel making dusts; zinc rich waste streams from iron making and steel making dusts; waste water treatment sludges from iron recovery operations; metal recovery wastes; heavy metal bearing wastes from remediation of heavy metal sites; municipal incinerator fly ash; and industrial waste incinerator fly ash.

12. The method of claim 5, wherein said low-permeability barrier is applied to said waste disposal site as a liner.

13. The method of claim 5, wherein said low-permeability barrier is applied to said waste disposal site as a cap.

14. The method of claim 13, further comprising the step of providing a drainage layer over said low-permeability barrier cap.

15. The method of claim 14, further comprising the step of providing a vegetated top cover over said drainage layer.

16. The method of claim 5, wherein said barrier is applied as an interim cover for said waste disposal site.

17. The method of claim 5, wherein said mixing step comprises the mixing of chemicals to a mixture having an available alkalinity of between about 6.9 and about 11.5%.

18. The method of claim 5, further comprising the step of adjusting the consistency of said portion of waste material which meets government standards by the addition of water to yield a flowable mass.

19. A low-permeability barrier for waste disposal sites, comprising:
   the reaction product of between about 25–70% by weight of a waste material selected from the group consisting of aqueous chemical waste sludge and electric arc furnace dust, and additive components comprising about 3–10% by weight fly ash, about 10–20% by weight lime kiln dust, ferrous-sulfate, hydrated lime to provide an alkalinity of about 9 to 9.5% and water;
   said composition containing at least about 0.2% by weight ferrous ions and being hardenable through chemical reactions, the product of which includes calcium alumino-silicates.

20. A method for forming a low-permeability barrier for a waste disposal site, comprising the steps of:

mixing a waste material selected from the group consisting of aqueous chemical waste sludge and electric arc furnace dust, and additive materials including fly ash, lime kiln dust, ferrous-sulfate, hydrated lime to provide an alkalinity of about 9 to 9.5%, and water, said composition containing ferrous ions and being hardenable through chemical reactions, the product of which includes calcium alumino-silicates;

applying said composition to said waste disposal site;

allowing said blend to set to produce a relatively impermeable concrete-like solid waste in which said heavy metals are physically entrapped or adsorbed therein.

21. The method of claim 20, further comprising the step of adjusting the consistency of said blend with water to yield a flowable mass prior to said application step.

* * * * *